(12) United States Patent
Van De Kreeke et al.

(10) Patent No.: US 6,863,242 B2
(45) Date of Patent: Mar. 8, 2005

(54) METHOD AND SYSTEM FOR CONTROLLING AN AIRCRAFT CONTROL SURFACE

(75) Inventors: Marc Van De Kreeke, Leguevin (FR); Guillaume Cassein, Toulouse (FR)

(73) Assignee: Airbus France, Toulouse (FR)

( * ) Notice: Subject to any disclaimer, the term of this patent is extended or adjusted under 35 U.S.C. 154(b) by 7 days.

(21) Appl. No.: 10/631,009

(22) Filed: Jul. 31, 2003

(65) Prior Publication Data

US 2004/0245387 A1 Dec. 9, 2004

(30) Foreign Application Priority Data

Jan. 21, 2003 (FR) .................................. 03 00612

(51) Int. Cl.[7] .............................................. B64C 9/06
(52) U.S. Cl. .................................................. 244/75 R
(58) Field of Search ............................... 244/203, 217, 244/45 R, 46, 75 R, 76, 175, 177, 194, 195; 701/3, 701/4, 8, 11; B64C 9/06

(56) References Cited

U.S. PATENT DOCUMENTS

| | | | |
|---|---|---|---|
| 2,412,646 A * | 12/1946 | Northrop et al. .............. 244/13 |
| 3,761,041 A * | 9/1973 | Putman ......................... 244/13 |
| 4,146,200 A * | 3/1979 | Borzachillo ................ 244/75 R |
| 4,455,000 A * | 6/1984 | Nilsson ....................... 242/374 |
| 4,455,004 A * | 6/1984 | Whitaker, Sr. ............. 244/90 R |
| 4,479,620 A * | 10/1984 | Rogers et al. ............. 244/75 R |
| 4,562,546 A * | 12/1985 | Wykes et al. ................... 701/4 |
| 4,796,192 A | 1/1989 | Lewis |
| 4,807,516 A * | 2/1989 | Takats ........................ 91/363 A |
| 4,821,981 A * | 4/1989 | Gangsaas et al. .......... 244/76 C |
| 4,892,274 A * | 1/1990 | Pohl et al. .................... 244/213 |
| 4,967,984 A * | 11/1990 | Allen ......................... 244/35 R |
| 5,186,416 A * | 2/1993 | Fabre et al. ............... 244/75 R |
| 5,375,794 A * | 12/1994 | Bleeg ........................ 244/76 C |
| 5,531,402 A * | 7/1996 | Dahl ......................... 244/75 R |
| 5,564,656 A * | 10/1996 | Gilbert ....................... 244/217 |
| 5,836,546 A * | 11/1998 | Gast .......................... 244/76 B |

(Continued)

FOREIGN PATENT DOCUMENTS

FR 978031 4/1951

(Continued)

OTHER PUBLICATIONS

Preliminary Search Report dated May 23, 2003.

*Primary Examiner*—Teri P. Luu
*Assistant Examiner*—Stephen Holzen
(74) *Attorney, Agent, or Firm*—Stevens, Davis, Miller & Mosher, LLP

(57) ABSTRACT

A system for controlling an aircraft control surface may include a control surface having at least two control surface elements mounted to rotate about an axis on a stabilizer element of the aircraft. An actuator with at least two actuating devices moves the control surface elements according to individual turn commands. Also, a first device determines a particular phase of flight of the aircraft. When the particular phase of flight is determined to exist by the first device, a second device generates differentiated individual turn commands for the actuating devices, according to an overall turn command received from a control unit, to provide prioritized control of the control surface element that generates the lowest force on the stabilizer element.

17 Claims, 3 Drawing Sheets

U.S. PATENT DOCUMENTS

| | | | |
|---|---|---|---|
| 5,899,410 A * | 5/1999 | Garrett | 244/45 R |
| 6,161,801 A | 12/2000 | Kelm et al. | |
| 6,241,183 B1 * | 6/2001 | Mathieu | 244/75 R |
| 6,386,485 B1 * | 5/2002 | Sjoquist | 244/194 |
| 6,554,229 B1 * | 4/2003 | Lam et al. | 244/217 |
| 6,641,086 B2 * | 11/2003 | Clark | 244/75 R |
| 6,793,171 B1 * | 9/2004 | Clark | 244/1 R |
| 2002/0022910 A1 | 2/2002 | Kubica et al. | |

FOREIGN PATENT DOCUMENTS

| | | |
|---|---|---|
| EP | 0978777 | 2/2000 |
| FR | 2809373 | 11/2001 |

* cited by examiner

METHOD AND SYSTEM FOR CONTROLLING AN AIRCRAFT CONTROL SURFACE

The present invention relates to a method and to a system for controlling a control surface of an aircraft, particularly of a transport airplane, said control surface being mounted on a stabilizer element of said aircraft.

In order to improve performance (fuel consumption, noise level, etc.) of an aircraft without reducing the payload, manufacturers are trying to reduce as far as possible the mass of the aircraft, that is to say the mass of the structure, of components, of equipment, etc. of said aircraft. For this purpose it may be advantageous to reduce the mass of stabilizer elements such as the fin, a horizontal stabilizer or a wing structure for example.

It is known that a stabilizer element of an aircraft is sized to account for the maximum forces to which it is likely to be subjected during the various configurations of flight of this aircraft. As a consequence, in order to limit the mass of such a stabilizer element and therefore also the mass of the aircraft, one solution is to reduce the forces to which this stabilizer element is likely to be subjected during a flight.

To do this, there is known, for example, from document FR-2 809 373 in the name of the applicant company, an electric control system for an aircraft rudder, by virtue of which system it is possible to limit the lateral loads applied in maneuvers to said rudder and therefore reduce the size and mass thereof, without thereby reducing flight quality of the aircraft or flight safety.

To do this, said known control system comprises:
  a rudder bar actuated by the pilot and associated with a transducer delivering an electric steering command representative of the action of the pilot on said rudder bar;
  an actuator receiving a control command derived from said steering command and moving said rudder about its axis of rotation; and
  between said rudder bar and said actuator, filtering means of the low-pass type receiving said steering command from said transducer and generating said control command for said actuator, the time constant of said filtering means being higher, the greater the amplitude of said steering command is as a proportion of the maximum travel of the rudder.

Thus, this known control system introduces, into the steering commands set at the rudder bar, nonlinear filtering that depends on the available rudder travel, the nearer said rudder gets to the stops limiting its maximum travel, the greater the filtering applied, thus limiting the loads applied to said control surface and therefore making it possible to reduce the mass and size of the latter.

This known control system does, however, have a major disadvantage, particularly when applied to a jumbo jet. What happens is that this known system requires a powerful and very expensive actuator in order to be able to move the control surface, because of the very high forces to which the latter is subjected, particularly on a heavy airplane.

It is an object of the present invention to remedy these disadvantages. The invention relates to a method for controlling a control surface of an aircraft in such a way as to reduce the induced forces to which a stabilizer element of said aircraft is subjected, on which element said control surface is mounted.

To this end, said method is notable, according to the invention, in that said control surface is produced in the form of at least two controllable control surface elements, each of said control surface elements being mounted so that it can rotate about an axis so that it can adopt any turn angle within a range of travel, in accordance with a control command, and in that said control surface elements are able to be controlled differentially.

As at least two actuators are thus provided, for moving the control surface (one actuator per control surface element of said control surface), less powerful and therefore less bulky, less heavy and, above all, less expensive actuators can be used.

In a first preferred alternative form of embodiment, for at least one particular phase of flight of the aircraft, a first of said control surface elements is controlled as a priority and generates a force on said stabilizer element which is lower than the force generated by the second control surface element for the same turn angle of said first and second control surface elements.

Thus, by virtue of the invention, the control surface element that generates the lowest force on the stabilizer element is controlled, this being done at least in said particular phase of flight. As a preference, said particular phase of flight of the aircraft is a phase of flight for which the force applied to said stabilizer element is very high and is above a force threshold corresponding to a predetermined percentage of a maximum force on said stabilizer element. Thus, by virtue of the present invention, the (maximum) high forces likely to be applied to the stabilizer element are reduced, making it possible to reduce the size and mass of the latter.

In a second alternative form of embodiment, a second of said control surface elements is controlled with a delay and generates a force on said stabilizer element which is higher than the force generated by a first control surface element for the same turn angle of said first and second control surface elements.

In a preferred embodiment of the present invention, there are defined:
  a first control mode, for which the (at least) two control surface elements are controlled identically; and
  a second control mode, for which the (at least) two control surface elements are controlled differentially, and, throughout the flight of the aircraft, said first control mode is used except in said particular phase of flight, for which said second control mode is used.

This preferred embodiment makes it possible:
  on the one hand, to limit the forces applied to the stabilizer element, by using, where necessary, said second control mode, for which the control surface element that generates the lowest force on said stabilizer element is essentially, or even exclusively, depending on the situation, controlled; and
  on the other hand, to reduce the fatigue and aging of said control surface elements, by always in normal and customary operation (therefore outside of the aforesaid particular phase of flight explained hereinbelow with reference to some particular embodiments of the invention) using said first control mode, for which the control surface elements are controlled identically, making it possible to spread the various forces over all said control surface elements, thus reducing the corresponding fatigue.

In a first embodiment, for a stabilizer element corresponding to a horizontal stabilizer, and a control surface comprising at least one inboard control surface element and one outboard control surface element (with respect to the longitudinal axis of the aircraft), said second control mode is used, for which said inboard control surface element is controlled as a priority when one of the following cases A and B arises:

A/ the aircraft is centered toward the front and the control surface is turned upward;

B/ the aircraft is centered toward the rear and the following conditions are simultaneously satisfied:
  a) the desired direction of turn of the control surface opposes the movement of the aircraft;
  b) the absolute value of the load factor on the aircraft is above a predetermined value; and
  c) the aircraft is in a clean configuration.

In a first alternative form of the invention, said case A arises when, in addition to the aforesaid conditions, the following condition a is also satisfied: the aircraft is in a clean configuration.

In a second alternative form of the invention, said case A arises when, in addition to the aforesaid conditions, the following condition β is also satisfied: the rate of travel of a control of the aircraft, for example a mini-stick, is greater than a predetermined value. This predetermined value may, for example, be chosen to be equal to half the maximum rate of travel of the control. Adding this condition β makes it possible not to impact on the current flight domain of the aircraft by activating the second control surface control mode. What actually happens is that a high value of said rate of travel of the control generally corresponds to higher forces on the control surface, something which activation of said second control mode seeks to reduce.

In addition, in a third alternative form, said case A arises when, in addition to the conditions quoted first (the aircraft is centered toward the front and the control surface is turned upward), the above conditions α and β are also (simultaneously) satisfied.

Furthermore, in said case B, advantageously:
the condition a) is satisfied when the sign of the product of the vertical load factor and of the turn angle is positive; and/or
the condition b) is satisfied, preferably, when the vertical load factor is greater than +1.5 g or less than −0.5 g, g being the acceleration due to gravity; and/or
the condition c) is satisfied when no customary lift-enhancing device of the aircraft is activated.

Furthermore, in a second embodiment, for a stabilizer element corresponding to a fin, and a control surface comprising at least one upper control surface element and one lower control surface element, said second control mode is used, for which said lower control surface element is controlled as a priority when the product Fδ·Fβ is less than zero, Fδ and Fβ being the aerodynamic forces exerted on said fin as a result of the turning of the control surface and of the yaw, respectively.

Furthermore, as an alternative or in addition, for a stabilizer element corresponding to a fin, and a control surface comprising at least one upper control surface element and one lower control surface element, said second control mode is used, for which said upper control surface element is controlled as a priority when the following two conditions are simultaneously satisfied:
the product Fδ·Fβ is greater than zero, Fδ and Fβ being the aerodynamic forces exerted on said fin as a result of the turning of the control surface and of the yaw, respectively; and
the absolute value of the yaw angle is greater than a predetermined value, for example than half the absolute value of the turn angle of the control surface.

Furthermore, in a particular embodiment, said control surface is produced in the form of at least three controllable control surface elements and said control surface elements are controlled in priority groups, each of said priority groups comprising, in each instance, at least one control surface element.

According to the invention, all possible types of control are conceivable in this case: for example controlling all the control surface elements separately in a particular order of priority, controlling just one control surface element in said second control mode, or controlling two of them, etc.

Furthermore, advantageously, filtering is applied to the control commands for said control surface elements, and different filtering is applied to the respective control commands for said various control surface elements.

The present invention also relates to a system for electrically controlling an aircraft control surface, of the type comprising:
  a control unit which comprises at least one control able to be actuated by a pilot and which delivers an overall turn command representing at least the action exerted by the pilot on said control; and
  an actuator which moves said control surface according to a turn command received.

According to the invention, said system is notable in that:
  said control surface comprises at least two control surface elements, each of said control surface elements being mounted to rotate about an axis so as to be able to adopt any turn angle within a range of travel;
  said actuator comprises at least two actuating means, each of said actuating means being associated with one of said control surface elements and being able to move said associated control surface element according to an individual turn command received; and
  said system additionally comprises:
    first means for determining a particular phase of flight of the aircraft; and
    second means which are arranged between said control unit and said actuating means and which, when said particular phase of flight is determined by said first means, generate, according to the overall turn command received from the control unit, differentiated individual turn commands for said actuating means, for example so as to control, as a matter of priority, that control surface element that generates the lowest force on said stabilizer element.

Advantageously, said first means comprise sensors for measuring the values of various parameters and a calculation unit for determining said particular phase of flight from the values measured by said sensors. As such sensors already exist, in general, on most aircraft, particularly on transport airplanes, the system according to the invention is simple to produce and inexpensive.

The figures of the attached drawing will make it easy to understand how the invention may be achieved. In these figures, identical references denote similar elements.

Figure 1:
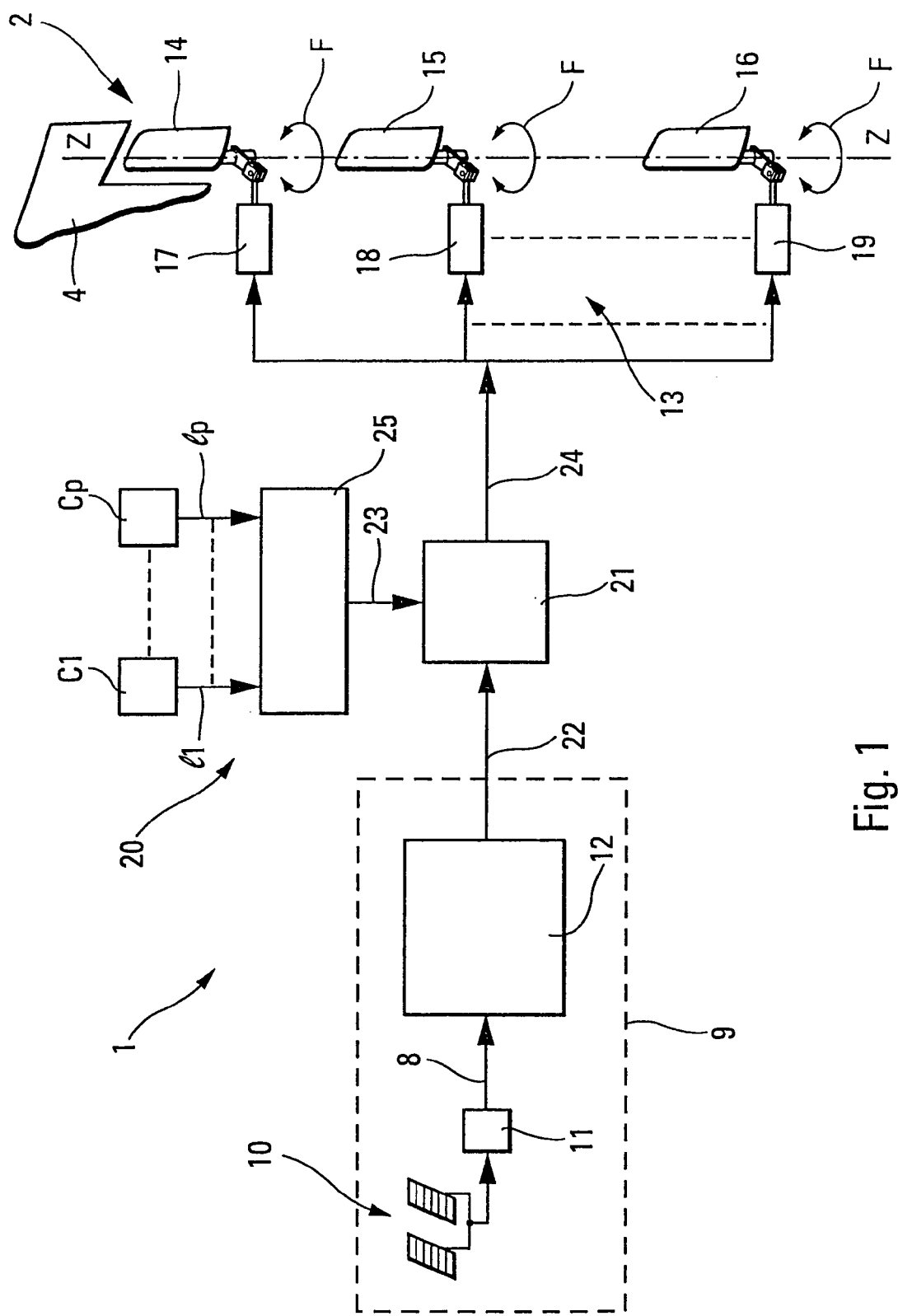
FIG. 1 is the block diagram of a control system according to the invention.

The electric control system 1 according to the present invention and depicted in FIG. 1 is intended to actuate a control surface 2 of an aircraft 3, which is mounted on a partially depicted stabilizer element 4 of said aircraft 3.

Figure 2:
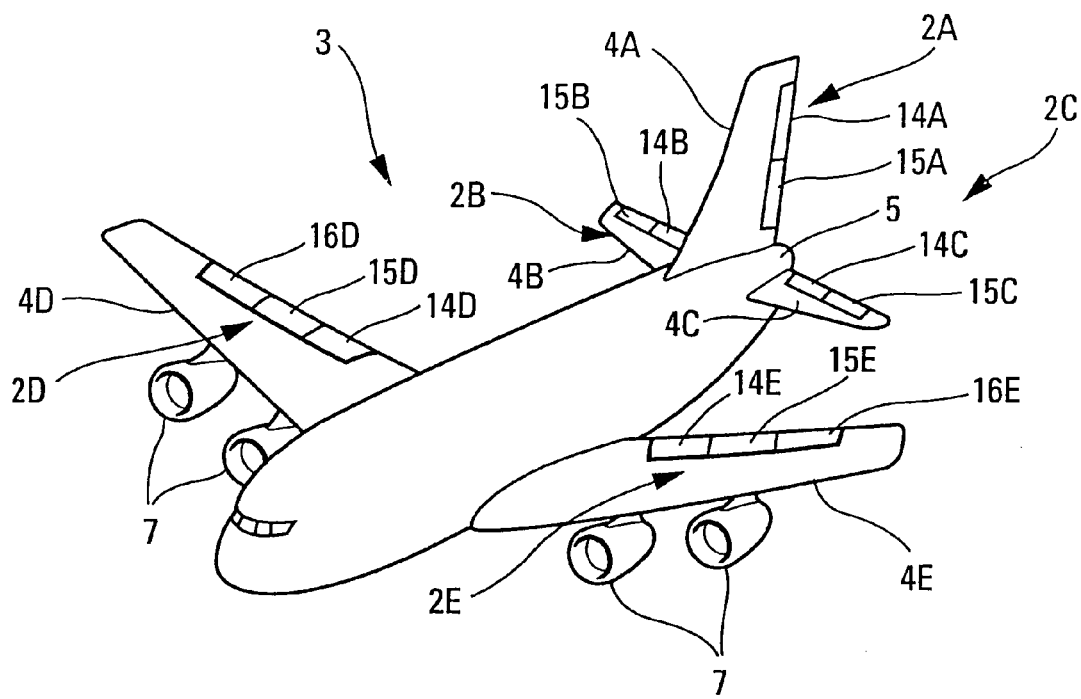
FIG. 2 shows a transport airplane to which, by way of example, a control system according to the invention is applied.

As can be seen in the example of a transport airplane 3 depicted in FIG. 2, said control surface 2 may, in the context of the present invention, in particular, be:

- a rudder 2A mounted on a fin 4A (stabilizer element);
- one of the elevators 2B, 2C mounted on horizontal stabilizers 4B, 4C (stabilizer elements) provided at the rear of the airplane 3, at the tail 5; and
- one of the lateral control surfaces 2D, 2E provided on the wings 4D, 4E (stabilizer elements) of the airplane 3, equipped with engines 7.

Said electric control system 1 is of known type, comprising:

- a control unit 9 comprising:
  - a control 10, for example a rudder bar or a mini-stick, able to be actuated by a pilot of the aircraft, and associated with a transducer 11 delivering an electric control command (relative to the turning of the control surface 2) representative of the actuation of said control 10; and
  - a calculation means 12 connected by a link 8 to said transducer 11 and delivering an overall turn command representative at least of the action exerted by the pilot on said control 10; and
- an actuator 13 which moves said control surface 2 according to a turn command received.

According to the invention:

- said control surface 2 comprises at least two control surface elements 14, 15, 16, each of said control surface elements 14, 15, 16 being mounted so that it can rotate in both directions about an axis Z—Z in the way symbolized by a double-headed arrow F, so that it can adopt any turn angle within a range of travel. As illustrated in the dashed line between the control surface elements 15, and 16 in FIG. 1, said control surface 2 can according to the invention adopt any number n (two, three, four, etc.) of control surface elements, n being an integer greater than or equal to 2;
- said actuator 13 comprises at least two actuating means 17, 18, 19, each of said actuating means 17, 18, 19 being associated with one of said control surface elements 14, 15, 16 and being able to move said associated control surface element according to an individual turn command received; and
- said system 1 additionally comprises:
  - means 20 for determining at least one particular phase of flight of the aircraft, this phase being specified hereinbelow; and
  - means 21 which are connected by links 22 and 23 respectively to said control unit 9 and to said means 20 and which, when said particular phase of flight is determined by said means 20, generate, according to the overall turn command received from the control unit 9, differentiated individual turn commands for said actuating means 17, 18, 19.

In a first preferred alternative form of embodiment, said means 21 generate differentiated individual turn commands in such a way as to control as a matter of priority that control surface element which generates the lowest force on said stabilizer element 4. Said means 21 are for this purpose connected by a multiple link 24 to said actuating means 17, 18, 19.

According to the invention, said particular phase of flight of the aircraft 3, determined by the means 20, is a phase of flight (case of flight, centering, maneuvering, etc.) for which the force Eeff applied to said stabilizer element 4 is above a force threshold Elim corresponding to a predetermined percentage, for example 90%, of a known maximum force Emax on said stabilizer element 4.

Thus, since by virtue of the invention, the control surface element that generates the lowest force on the stabilizer element 4 is controlled (at least) during the said particular phase of flight, the maximum forces applied to said stabilizer element 4 are limited, making it possible to reduce the size and mass of this element.

Furthermore, as at least two actuators 17, 18, 19 are provided for moving the control surface 2 (one actuator 17, 18, 19 per control surface element 14, 15, 16 of said control surface 2), less powerful and therefore less bulky, less heavy and above all less expensive actuators 17, 18, 19 can be used.

In a second alternative form of embodiment, the control system 1 according to the invention controls with a delay a second of said control surface elements which generates a force on said stabilizer element 4 which is higher than the force generated by a first control surface element (controlled first) for the same turn angle of said first and second control surface elements.

In a preferred embodiment, there are provided:

- a first control mode, for which the means 21 control the (at least) two control surface elements 14, 15, 16 identically via said actuators 17, 18, 19; and
- a second control mode, for which the means 21 differentially control the (at least) two control surface elements 14, 15, 16 via said actuators 17, 18, 19.

In addition, said means 21 use said first control mode throughout the flight of the aircraft 3 except in said particular phase of flight, for which they use said second control mode.

This preferred embodiment makes it possible:

- on the one hand, to limit the forces applied to the stabilizer element 4, by, where necessary, using said second control mode, for which that one of said control surface elements 14, 15, 16 that generates the lowest force on said stabilizer element 4 is controlled as a priority (that is to say essentially, or even exclusively, depending on the situation); and
- on the other hand, to reduce the fatigue and aging of said control surface elements 14, 15, 16, by always in normal and usual operation (and therefore outside the aforesaid particular phase of flight explained below on the basis of some particular exemplary embodiments of the invention) using said first control mode, for which the control surface elements 14, 15, 16 are controlled identically, making it possible to spread the various forces over all said control surface elements 14, 15, 16 and thus making it possible to reduce the fatigue and wear of these control surface elements 14, 15, 16.

Furthermore, said means 20 comprise:

- a set of sensors $C1, \ldots, Cp$, p being an integer, for measuring the values of various parameters specified hereinbelow; and
- a calculation unit 25 connected by links $l1, \ldots, lp$ respectively to said sensors $C1, \ldots, Cp$, to determine, from values measured by said sensors $C1, \ldots, Cp$, said particular phase of flight.

It will be noted that the various control surface elements 14, 15, 16 of a control surface 2 may be arranged in such a way as to rotate about one and the same axis Z—Z as depicted in FIG. 1. However, it is of course also possible for each control surface element to rotate about a particular axis different from the axes of the other control surface elements.

Furthermore, according to the invention, when the control surface 2 has at least three control surface elements 14, 15, 16 (as for example depicted in FIG. 2 in the case of the lateral control surfaces 2D and 2E each of which comprises the three control surface elements 14D, 15D, 16D and 14E, 15E, 16E, respectively), all possible types of control are conceivable.

Figure 3:
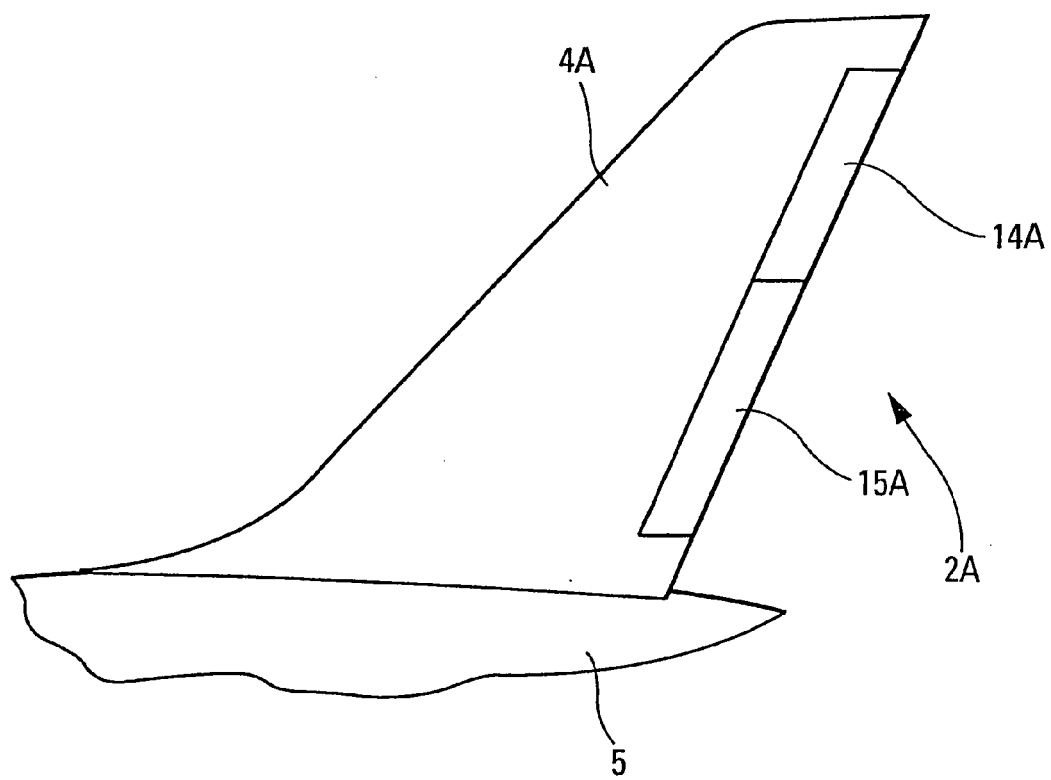
FIG. 3 shows a rudder mounted on a fin and produced in accordance with one particular embodiment of the invention.

Reference is now made to the particular embodiment depicted partially in FIG. 3, for which the stabilizer element corresponding to the fin 4A and the control surface 2A comprises an upper control surface element 14A and a lower control surface element 15A, which are arranged vertically one above the other.

In this embodiment two particular phases of flight arise, for which the system 1 uses said second control mode, that is to say for which the control surface elements 14A, 15A are controlled differentially and the control surface element that generates the lowest force on the fin 4A is controlled as a priority. The differential turning of the two control surface elements 14A, 15A needs to make it possible to alter the arm of the resulting force on the fin 4A and thus reduce the bending moment and therefore the envelope of the bending loads. Now, in this embodiment, the priority control surface element is not the same for the two particular phases of flight.

This is because, primarily, according to the invention, the system 1 uses said second control mode for which the lower control surface element 15A is controlled as a priority (to reduce the bending of the fin 4A) when the product $F\delta \cdot F\beta$ is less than zero, $F\delta$ and $F\beta$ being the aerodynamic forces exerted on said fin 4A as a result of the turning of the control surface and of the yaw, respectively. Of course, the means 20 comprise two sensors Ci and Ci+1 (not depicted specifically) to measure the yaw $\beta$ and the turn $\delta$, and the calculation unit 25 on the basis of these values calculates the sign of the product $F\delta \cdot F\beta$ and compares it with zero, in order to determine said particular phase of flight.

Secondly, according to the invention, the system 1 uses said second control mode for which the upper control surface element 14A is controlled as a priority when the following two conditions are simultaneously satisfied:

the product $F\delta \cdot F\beta$ is greater than zero, $F\delta$ and $F\beta$ being the aerodynamic forces exerted on said fin 4A as a result of the turning of the control surface and of the yaw, respectively; and the absolute value of the yaw angle is greater than a predetermined value, for example than half the absolute value of the turn angle of the control surface.

Figure 4:
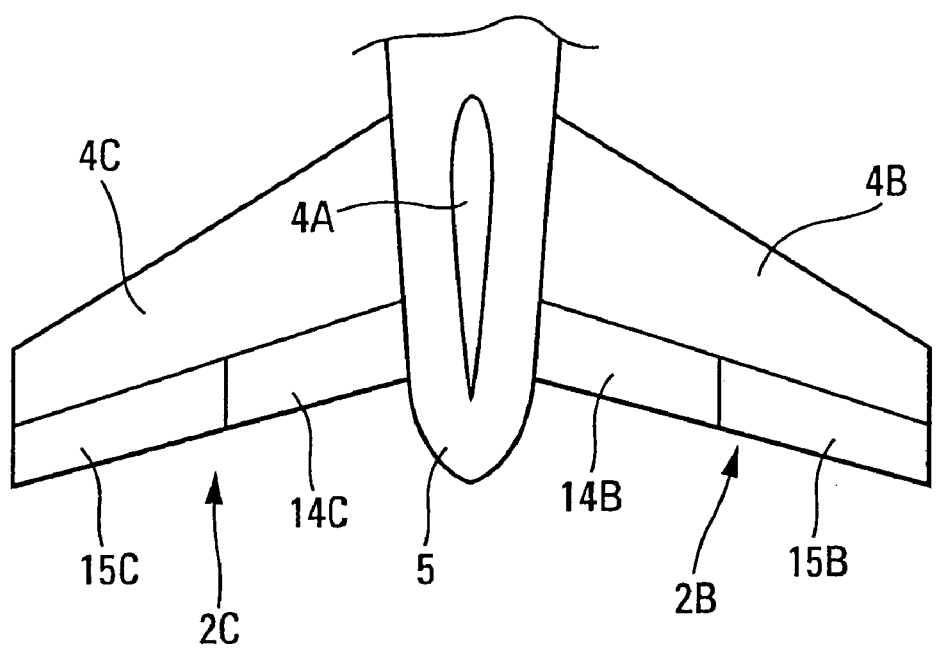
FIG. 4 shows control surfaces mounted on horizontal stabilizers and produced according to one particular embodiment of the invention.
Figure 5:
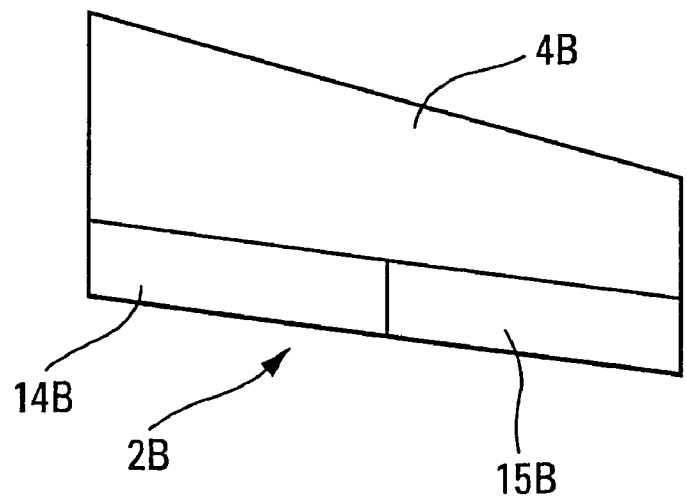
FIG. 5 is an enlarged view of part of FIG. 4, showing a control surface mounted on a horizontal stabilizer.

Furthermore, the particular embodiment depicted in FIGS. 4 and 5 anticipates, by way of stabilizer element, the horizontal stabilizer 4B and a control surface 2B comprising two control surface elements 14B, 15B, namely an inboard control surface element 14B (with respect to the longitudinal axis of the aircraft 3) and an outboard control surface element 15B.

According to the invention said system 1 uses said second control mode, for which the inboard control surface element 14B that generates the lowest force on said horizontal stabilizer 4B is controlled as a priority when one of the following cases A/ and B/ arises:

A/ the aircraft 3 is centered toward the front and the control surface 2B is turned upward;

B/ the aircraft 3 is centered toward the rear and the following conditions are simultaneously satisfied:

a) the desired direction of turn of the control surface 2B opposes the movement of the aircraft 3;

b) the absolute value of the load factor on the aircraft 3 is above a predetermined value; and c) the aircraft 3 is in a clean configuration.

In a first alternative form of the invention, said case A arises when, in addition to the aforesaid conditions, the following condition $\alpha$ is also satisfied: the aircraft 3 is in a clean configuration.

In a second alternative form of the invention, said case A arises when, in addition to the aforesaid conditions, the following condition $\beta$ is also satisfied: the rate of travel of the control 10 of the aircraft 3, for example a mini-stick, is greater than a predetermined value. This predetermined value may, for example, be chosen to be equal to half the maximum rate of travel of the control 10. Adding this condition $\beta$ makes it possible not to impact on the current domain of flight of the aircraft 3 by activating the second control mode for controlling the control surface 2B. What happens is that a high value of said rate of travel of the control 10 generally corresponds to high forces on the control surface 2B, something that it is desired to reduce by activation of said second control mode.

In addition, in a third alternative form, said case A arises when, in addition to the already-mentioned conditions (the aircraft 3 is centered toward the front and the control surface 2B is turned upward), the previous conditions $\alpha$ and $\beta$ are also (simultaneously) satisfied.

Furthermore, according to the invention, for said case B:

the condition a) is satisfied when the sign of the product of the vertical load factor and of the turn angle is positive;

the condition b) is satisfied when the vertical load factor is greater than +1.5 g or less than -0.5 g, g being the acceleration due to gravity; and the condition c) is satisfied when no customary lift-enhancing device, not depicted, of the aircraft is activated.

The means 20 comprise appropriate sensors for measuring the above parameters.

Furthermore, use is made of the value of the angle at which the horizontal stabilizer 4B is set (the angle formed between the longitudinal axis of the aircraft 3 and said horizontal stabilizer 4B) to discriminate the cases of "front centering" from the cases of "rear centering". This setting, when the aircraft 3 is in stabilized level flight, is representative of the centering of the aircraft 3. For example, it can be said that, for set angles less than -1.5°, there is front centering and, for set angles greater than -1.5°, there is rear centering. The sign of this angle is such that, for a horizontal stabilizer 4B the front part of which points downward, the set angle is negative, and if the front part points upward, the set angle is positive. In front centering, the center of gravity of the aircraft 3 is situated toward the front of the aircraft 3 whereas, in rear centering, the center of gravity of the aircraft 3 is situated toward the rear of this aircraft 3.

It will be noted that the use of the inboard control surface element 14B makes it possible to reduce the lever arm applied to the aerodynamic force experienced for the horizontal stabilizer 4B so that the bending moment can thus be reduced.

Furthermore, filtering is applied to the control commands for said control surface elements 14, 15, 16, and different filtering is applied to the respective control commands of said various control surface elements 14, 15, 16.

What is claimed is:

1. A method for controlling a control surface of an aircraft, which control surface is controlled by a pilot and mounted on a stabilizer element of said aircraft, said control surface comprising at least two controllable control surface elements, each of said control surface elements being mounted so that it can rotate about an axis so that it can adopt any turn angle within a range of travel, in accordance with a control command, and said control surface elements being able to be controlled differentially, wherein, for at least one particular phase of flight of the aircraft, a first of said control surface elements is controlled as a priority and generates a force on said stabilizer element which is lower than the force generated by the second control surface element for the same turn angle of said first and second control surface elements.

2. The method as claimed in claim 1, wherein said particular phase of flight of the aircraft is a phase of flight for which the force applied to said stabilizer element is above a force threshold corresponding to a predetermined percentage of a maximum force on said stabilizer element.

3. The method as claimed in claim 1, wherein:
there are defined:
a first control mode, for which the two control surface elements are controlled identically; and
a second control mode, for which the two control surface elements are controlled differentially,
throughout the flight of the aircraft, said first control mode is used except in said particular phase of flight, for which said second control mode is used.

4. The method as claimed in claim 1, wherein a second of said control surface elements is controlled with a delay and generates a force on said stabilizer element which is higher than the force generated by a first control surface element for the same turn angle of said first and second control surface elements.

5. The method as claimed in claim 3, wherein for the stabilizer element corresponding to a horizontal stabilizer and the control surface comprising at least one inboard control surface element and one outboard control surface element, said second control mode is used, for which said inboard control surface element is controlled as a priority when one of the following cases A and B arises:
A/ the aircraft is centered toward the front and the control surface is turned upward;
B/ the aircraft is centered toward the rear and the following conditions are simultaneously satisfied:
a) the desired direction of turn of the control surface opposes the movement of the aircraft;
b) the absolute value of the load factor on the aircraft is above a predetermined value; and
c) the aircraft is in a clean configuration.

6. The method as claimed in claim 5, wherein said case A arises when the following condition is also satisfied: the aircraft is in a clean configuration.

7. The method as claimed in claim 5, wherein said case A arises when the following condition is also satisfied: the rate of travel of a control of the aircraft is greater than a predetermined value.

8. The method as claimed in claim 5, wherein said condition a) is satisfied when the sign of the product of the vertical load factor and of the turn angle is positive.

9. The method as claimed in claim 5, wherein said condition b) is satisfied when the vertical load factor satisfies one of the following conditions:
it is greater than +1.5 g
it is less than -0.5 g, g being the acceleration due to gravity.

10. The method as claimed in claim 5, wherein said condition c) is satisfied when no lift-enhancing device of the aircraft is activated.

11. The method as claimed in claim 3, wherein, for the stabilizer element corresponding to a fin and the control surface comprising at least one upper control surface element and one lower control surface element, said second control mode is used, for which said lower control surface element is controlled as a priority when the product $F\delta \cdot F\beta$ is less than zero, $F\delta$ and $F\beta$ being the aerodynamic forces exerted on said fin as a result of the turning of the control surface and of the yaw, respectively.

12. The method as claimed in claim 3, wherein, for the stabilizer element corresponding to a fin and the control surface comprising at least one upper control surface element and one lower control surface element, said second control mode is used, for which the upper control surface element is controlled as a priority when the following two conditions are simultaneously satisfied:
the product $F\delta \cdot F\beta$ is greater than zero, $F\delta$ and $F\beta$ being the aerodynamic forces exerted on said fin as a result of the turning of the control surface and of the yaw, respectively; and
the absolute value of the yaw angle is greater than a predetermined value.

13. The method as claimed in claim 1, wherein said control surface is produced in the form of at least three controllable control surface elements and said control surface elements are controlled in priority groups, each of said priority groups comprising, in each instance, at least one control surface element.

14. The method as claimed in claim 1, wherein filtering is applied to the control commands for said control surface elements, and different filtering is applied to the respective control commands for said various control surface elements.

15. A system for electrically controlling an aircraft control surface, comprising:
a control unit which comprises at least one control able to be actuated by a pilot and which delivers an overall turn command representing at least the action exerted by the pilot on said control; and
an actuator which moves said control surface according to a turn command received, said control surface comprising at least two control surface elements, each of said control surface elements being mounted to rotate about an axis so as to be able to adopt any turn angle within a range of travel; wherein:
said actuator comprises at least two actuating means, each of said actuating means being associated with one of said control surface elements and being able to move said associated control surface element according to an individual turn command received; and
said system additionally comprises:
first means for determining a particular phase of flight of the aircraft; and
second means which are arranged between said control unit and said actuating means and which, when said particular phase of flight is determined by said first means, generate, according to the overall turn command received from the control unit, differentiated individual turn commands for said actuating means.

16. The system as claimed in claim 15, wherein said first means comprise sensors for measuring the values of various parameters and a calculation unit for determining said particular phase of flight from the values measured by said sensors.

17. An aircraft, that comprises the control system specified in claim 15.

* * * * *